C. McKEEVER.
SIGNAL APPARATUS.
APPLICATION FILED MAR. 2, 1916.

1,311,662.

Patented July 29, 1919.
2 SHEETS—SHEET 1.

WITNESS
Chas. J. Clagett

INVENTOR
Charles McKeever
BY
HIS ATTORNEYS

C. McKEEVER.
SIGNAL APPARATUS.
APPLICATION FILED MAR. 2, 1916.
1,311,662.
Patented July 29, 1919.
2 SHEETS—SHEET 2.
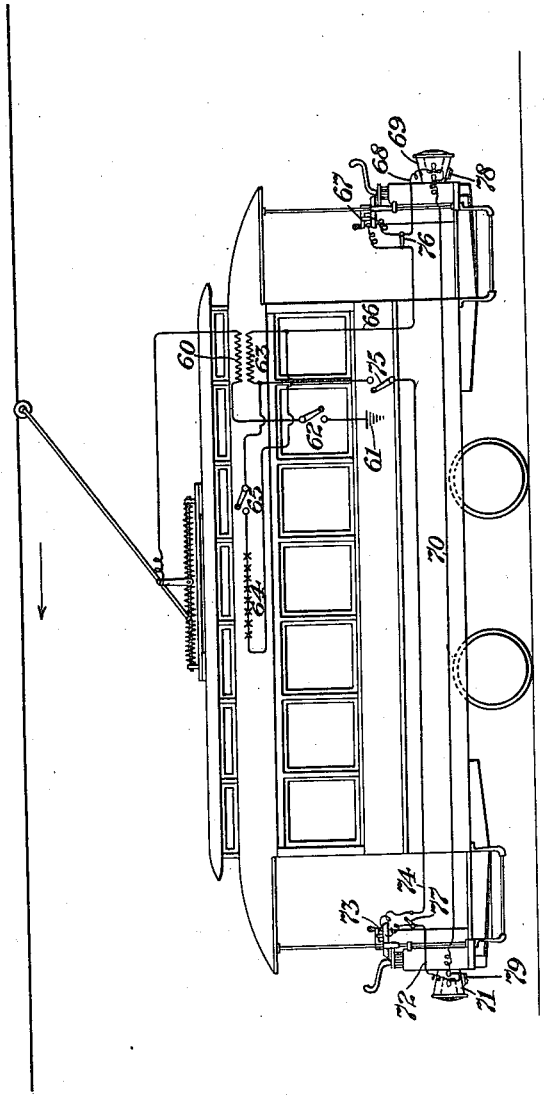
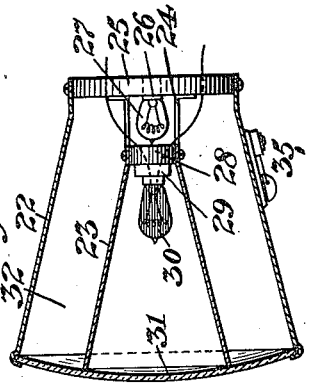
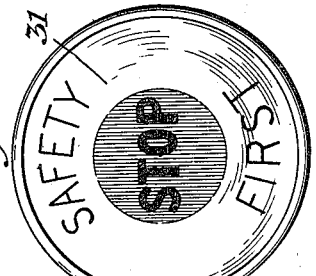
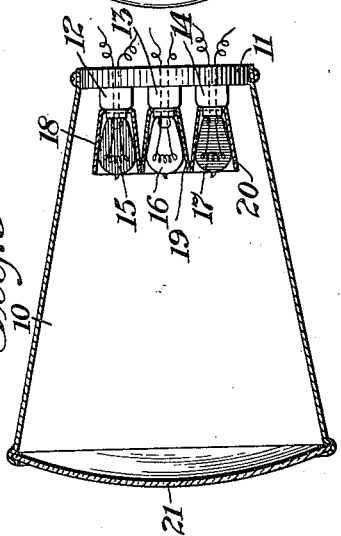
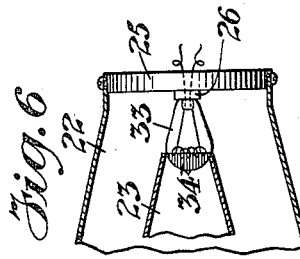
WITNESS
Chas. F. Clagett
INVENTOR
Charles C. McKeever
BY
His Attorneys

UNITED STATES PATENT OFFICE.

CHARLES McKEEVER, OF JERSEY CITY, NEW JERSEY, ASSIGNOR OF ONE-THIRD TO WILLIAM H. DICKINSON AND ONE-THIRD TO CLEM B. MEARS, BOTH OF NEW YORK, N. Y.

SIGNAL APPARATUS.

1,311,662.   Specification of Letters Patent.   Patented July 29, 1919.

Application filed March 2, 1916.  Serial No. 81,585.

*To all whom it may concern:*

Be it known that I, CHARLES McKEEVER, a citizen of the United States, residing in Jersey City, county of Hudson, and State of New Jersey, have invented an Improvement in Signal Apparatus, of which the following is a specification.

My present invention relates to a signal apparatus particularly adapted for use with motor vehicles including automobiles and trolley cars for example. As is generally known much confusion often arises and sometimes results in serious accidents because the driver of the car in the rear had no knowledge of the course or direction which a car in front may take. Ordinarily in driving automobiles it has become customary to thrust out the hand and arm to indicate that the car is either going to stop or turn a corner. In operating said cars, however, so far as I am aware, there is no apparatus in common use to indicate from both the front and the rear whether or not a car is going to stop or continue its travel.

I am aware that heretofore various devices have been suggested for use in motor driven vehicles to indicate to persons in the rear the course which a car is going to take and my present invention relates generally to this class of signals. In carrying out the same I preferably employ signal lamps in pairs, as well as a device for giving an audible signal and the apparatus includes means for operating the said lamps in each of which there are different colored lights so that parties in front of the car as well as in the rear thereof may know whether a car is going to continue its direction of travel in a straight path or is going to turn a corner or stop and the apparatus comprising my invention will be hereinafter more particularly described, in connection with the accompanying drawings in which—

Fig. 2, is a side elevation as applied to trolley cars.

Fig. 3, is a central longitudinal section through one of the lamps employed in carrying out my invention.

Fig. 4, is a similar view illustrating another lamp.

Fig. 5, is an end elevation of the same.

Fig. 6, is a partial central longitudinal cross section illustrating a modification of the type of lamp shown in Fig. 4.

Figure 1:
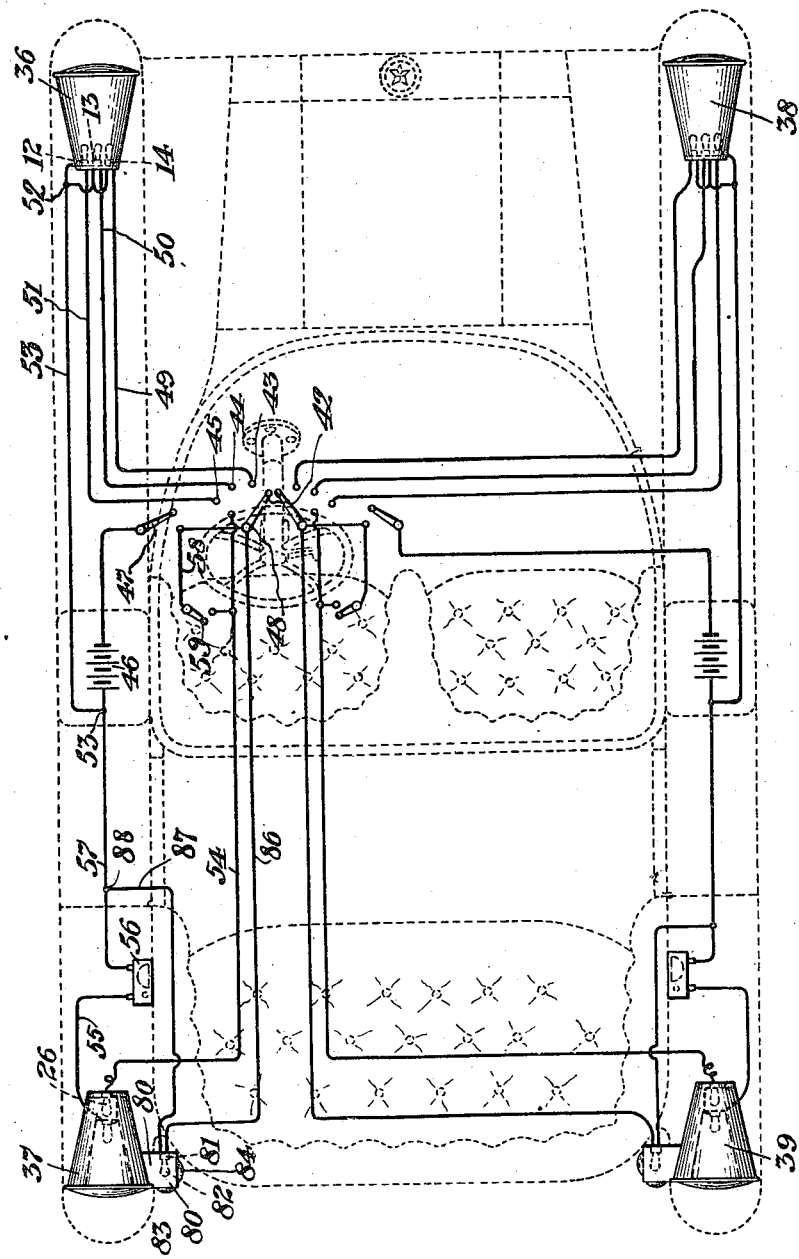
Figure 1, is a plan view illustrating the invention as applied to automobiles.

Referring to the drawing and particularly to Fig. 3 in carrying out my invention I employ a signal lamp comprising a casing 10 which is preferably conical and in the smaller end of which is fitted a base 11. In this base there are sockets 12, 13 and 14 adapted respectively to receive electric lamp bulbs 15, 16 and 17, the former of which is preferably red, the latter green, while the lamp bulb 16 is of the ordinary construction to give the usual white light. These lamp bulbs when in place are within reflectors 18, 19 and 20, secured respectively in any suitable manner to the sockets 12, 13 and 14. In the opposite or large end of the casing, a lens 21 or other suitable glass front is secured, being mounted in a door as is customary or in any other suitable manner. This form of lamp in carrying out my invention is preferably connected to the front mud guards, or other suitable portions, of an automobile as indicated in Fig. 1, and as will be apparent depending upon the connections made to the lamp bulbs will provide either a white, red or green light.

Referring to Fig. 4 it will be seen that I also employ a lamp comprising an outer casing 22 made of any suitable material and preferably conical, and within the outer casing 22 I employ an inner casing 23 which is made of similar material and concentric therewith. The inner casing is secured in position by suitable supports 24 extending between the same and the base 25 which is fixed in the smaller end of the outer casing 22. In the base 25 there is a socket 26 adapted to receive an electric light bulb 27 made of ordinary glass and thus adapted to emit a white light. In a base 28 secured in the smaller end of the inner casing 23 is a socket 29 adapted to receive a lamp bulb 30 which is preferably made of red glass so as to emit a red light and in the larger end of the outer casing 22, a lens 31 or other glass is provided, the same being mounted in a door or in any other suitable manner. In Fig. 6, I have shown a modified form of this lamp in which a single electric lamp bulb is employed. This is indicated at 33 and the outer end thereof 34 is made of red glass and adapted to fit the smaller end of the inner casing 23.

As will be apparent in the use of the lamps shown in Figs. 4 and 6, the outer casing acts as a reflector for the white light which will pass through the annular space 32 between the inner and outer casings and show through the lens in a ring, whereas the red light will be reflected by the inner surface of the inner casing 23 against the lens in the shape of a ball or circle. This is indicated in Fig. 5 and as also indicated therein the lens may be suitably lettered with the words "Safety first" in the ring which shows white and with the word "Stop" across the ring which shows red.

Associated with the lamp shown in Fig. 4 I have indicated an electric bell 35 and as it will be understood this may be employed with the form of lamp shown in Figs. 3 and 6 and suitably connected with the light circuits to also provide an audible signal when the circuits are closed to the electric lamp bulbs; and it will be further understood the bell instead of being associated directly with the lamp may be placed in position in any suitable place on the vehicle.

By reference to Fig. 1 it will be seen that I preferably employ the lamps hereinbefore described in pairs each pair comprising a lamp as shown in Fig. 3 and a lamp as shown in Fig. 4 or Fig. 6. The lamp shown in Fig. 3 is suitably placed at the front of the vehicle and the lamp shown in either Fig. 4 or 6 at the rear of the vehicle and at the same side thereof. A similar pair is fixed similarly to the other side of the vehicle but inasmuch as the operation of the pairs of lamps are the same I will describe the operation of but one pair.

In Fig. 1 the lamp fixed on one side at the front of the vehicle is indicated at 36 and as hereinbefore stated is of the type illustrated in Fig. 3, while the lamp fixed at the rear of the vehicle, on the same side thereof is indicated at 37 and is of the type illustrated in either Fig. 4 or 6. Similar lamps on the opposite side of the vehicle are indicated respectively at 38 and 39. To operate these lamps I may employ switches 40 and 41 suitably located adjacent the steering wheel of the vehicle and as hereinbefore stated the operation of but one set of lamps will be specifically described. The switch 40 may comprise an arm 42 and contacts 43, 44 and a pair of contacts 45 against either of which the arm 42 may be brought to bear. In the drawing I have illustrated a battery 46 for operating the lamps but it will be understood the same may be operated in the magneto circuit if desired. From one terminal of the battery 46 a line is carried through a switch 47 to a junction point 48 which is the pivotal point of the arm 42. The arm 42 which as hereinbefore stated, may be moved so as to bear against contact 43, contact 44 or both the contacts 45. The contact 43 is connected to one terminal of the first light in the lamp 36 by a line 49. The contact 44 is connected to the second light in the lamp 36 by a line 50 and one contact 45 is connected to one terminal of the third light in the lamp 36 by a line 51. The other terminals of each of these lights in the lamp 36 are suitably connected to a junction point 52 in a line 53 which is connected to the opposite terminal of the battery 46. The other terminal 45 is connected by a line 54 to one terminal of one light in the lamp 37. The lights in the lamp 37 are connected in series, and the other terminal of the other light therein is connected by a line 55 to one terminal of a bell or other audible signal 56, while the opposite terminal of this audible signal is connected by a line 57 to the opposite terminal of the battery.

In the type of lamp adapted to be used on the rear of a car, as indicated at 37, I may employ an auxiliary casing 80 in which is fixed a lamp socket 81, adapted to receive a lamp bulb 82. In this auxiliary casing 80 there is secured at the rear thereof, a red lens 83 and at one side thereof a white lens 84. The red lens is used for the ordinary tail light, while the white lens, together with a suitable reflector is employed to throw the light on the plate bearing the license number of the car, as is customary.

The circuit to the tail light 82 may include a line 86 extending from the fixed terminal or pivotal point of the arm 42 to one terminal of the light 82, the other terminal of the light 82 being connected by a line 87 to a junction point 88 in the line 57. Furthermore, the rear signal lights in the lamp 37 may be arranged to operate independently of the front lights, by extending a line 58, having therein a switch 59 from one of the terminals of the switch 47 to a suitable point in the line 54.

Now, it will be apparent that by closing the switch 47, the circuit will be closed to the tail light 82 and also when the switch 47 is closed, the arm 42 may be moved to bear against the contact 43 to close the circuit to the first light in the lamp 37, which may be a white light or to bear against the contact 44 to close the circuit to the second light in the lamp 36, which may be a green light or to bear against both contacts 45 to simultaneously close the circuit to the third light in the lamp 36 which may be a signal light of any suitable color, and also to close the circuit through the signal lights at the rear in the lamp 37. In closing this latter circuit, which includes the bell or audible signal 56, this also will be caused to ring or indicate in some other manner. It will also be apparent that when the arm 42 is not in contact with any of the contact points against which it is adapted to bear, or when it happens to be against either of the contacts 43 or 44, the rear signal light 37 and the audible signal used in conjunction therewith, may be operated by closing the switch 59.

Referring to Fig. 2 in which the invention is illustrated in use with a trolley car it may be seen that I have in this instance preferred to use that form of lamp illustrated in either Fig. 4 or Fig. 6, one lamp being placed at either end of the car. These lamps are operated from the light circuit and controlled automatically by the usual controller lever to indicate to persons in front waiting for a car or wishing to cross the street, as well as to persons in the rear of the car that the car is going to stop or continue its travel. In Fig. 2, 60 illustrates a primary coil of a transformer, one terminal of which is connected to line and the other terminal is grounded in the motor frame or otherwise as indicated at 61, and the connection between the primary coil and the point in which it is grounded is provided with a switch 62 for opening and closing the circuit. The secondary of the transformer is indicated at 63 and as is customary the circuit in which the lights 64 are employed is connected across the terminals of the secondary coil 63. This circuit is provided with a switch 65 by which the lights are controlled. From one terminal of the secondary coil 63 a line 66 is run to one terminal of a switch 67 opened and closed by the controller lever at one end of the car, this switch 67 being closed when the controller lever is turned to shut off the operating current and opened when the controller lever is moved to turn on the operating current. From the other terminal of the switch 67 a line 68 is run to one terminal of the sockets in the lamp 69. The other terminal of these sockets is connected by a line 70 to one terminal of the sockets in the lamp 71 on the opposite end of the car. The other terminal of the sockets in the lamp 71 is connected by a line 72 to one terminal of a switch 73 similar to the switch 67 and operated in a similar manner by the controller lever at the opposite end of the car. The other terminal of the switch 73 is connected by a line 74 to the opposite terminal of the secondary 63 of the induction coil and in this line there is a switch 75. A switch 76 is also provided across the terminals of the switch 67, and similarly a switch 77 across the terminals of the switch 73. Also as indicated at 78 and 79 the lamps 69 and 71 may be provided respectively with electric bells or other audible signals suitably connected in the circuits of the signal lights.

These lights are operated in the following manner; assuming that the car is moving in the direction indicated by the arrow in Fig. 2, in which instance of course the motorman will operate the controller at the left hand end of the car as viewed in this figure. The switches 62 and 75 are closed. The switch 76 is also closed, and because the controller lever is removed the switch 67 is open. The switch 77 is also open. Now as it will be seen by tracing the circuit the lights in the lamps 69 and 71 may be operated from the lever of the controller at the left hand end of the car. When this lever is turned to shut off the current the switch 73 will be closed, thereby closing the circuit through the line 74, the switch 75 to one terminal of the secondary of the induction coil, then through the line 66 to switch 76, the line 68, the lights in the lamps 69, the bell 78, the line 70, the lights in the lamp 71, through the line 72 to the opposite terminal of the switch 73. When the lever of the controller is turned to operate the car the switch 73 is opened and the lights in the lamps extinguished. It will be apparent that the operation of the lamps from the opposite end of the car is in all respects similar to that hereinbefore described with the understanding that when so operated the switch 76 is open and the switch 77 closed.

I claim as my invention:

1. A vehicle signal apparatus comprising a front lamp, having a plurality of lights therein, a rear lamp also having a plurality of lights therein, including a signal light and a tail light, electrical connections, a switch for closing the circuit to the said tail light, and a unitary device operative when the switch for closing the circuit to the tail lamp is closed, to close a circuit to a predetermined light in the front lamp, and also to simultaneously close circuits to another predetermined light in the front lamp and a light in the rear lamp.

2. A vehicle signal apparatus comprising a front lamp, a rear lamp, a tail lamp, electrical connections, a switch for closing the circuit to the tail lamp, and a unitary device operative when the switch in the tail lamp circuit is closed, for closing the circuit to a light in the front lamp, and also for simultaneously closing the circuit to another light in the front lamp and a light in the rear lamp.

3. A vehicle signal apparatus comprising a front lamp, a rear lamp, a tail lamp, electrical connections, a switch for closing the circuit to the tail lamp, and a unitary device operative when switch in the tail lamp circuit is closed, for closing the circuit to a light in the front lamp, and also for simultaneously closing the circuit to another light in the front lamp, and the lights in the rear lamp, and means for closing the circuit to the light in the rear lamp independently of the said device for closing circuits to the lights in the front lamp.

4. A vehicle signal apparatus comprising a single compartment front lamp, having a plurality of lights therein, a rear lamp having a plurality of signal lights and also a tail light, electrical connections, a switch for closing the circuit including the tail light, and a signal circuit switch which may be operated when the tail circuit switch is closed, to complete a circuit to any light in the front lamp, and simultaneously with closing a circuit to a predetermined light in the front lamp to close the circuit to the signal lights in the rear lamp.

Signed by me this 18th day of February, 1916.

CHARLES McKEEVER.